United States Patent
Yano

(10) Patent No.: US 9,036,863 B2
(45) Date of Patent: May 19, 2015

(54) RESUMING TRACKING AFTER LOSING TARGET

(75) Inventor: Kotaro Yano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 334 days.

(21) Appl. No.: 13/461,585

(22) Filed: May 1, 2012

(65) Prior Publication Data

US 2012/0288152 A1 Nov. 15, 2012

(30) Foreign Application Priority Data

May 10, 2011 (JP) ................. 2011-105647

(51) Int. Cl.
G06K 9/00 (2006.01)
G06K 9/62 (2006.01)
G06T 7/20 (2006.01)
G06K 9/66 (2006.01)

(52) U.S. Cl.
CPC .............. *G06K 9/6262* (2013.01); *G06T 7/204* (2013.01); *G06T 2207/30201* (2013.01); *G06K 9/66* (2013.01)

(58) Field of Classification Search
None
See application file for complete search history.

(56) References Cited

U.S. PATENT DOCUMENTS

| 7,699,423 | B2 | 4/2010 | Suwa et al. | |
|---|---|---|---|---|
| 2011/0311100 | A1* | 12/2011 | Fan | 382/103 |
| 2012/0063639 | A1 | 3/2012 | Yano | |
| 2012/0092495 | A1 | 4/2012 | Yano | |

FOREIGN PATENT DOCUMENTS

JP 2008-217768 A 9/2008

OTHER PUBLICATIONS

U.S. Appl. No. 13/446,898, filed Apr. 13, 2012, Applicants: Yuji Kaneda, et al.
U.S. Appl. No. 13/459,021, filed Apr. 27, 2012, Applicants: Takashi Suzuki, et al.
P. Viola et al., "Rapid object detection using a boosted cascade of simple features", In. Proc. IEEE Conf. on Computer Vision and Pattern Recognition, pp. 1-9 (2001).
Grabner, et al., "Eigenboosting: Combining Discriminative and Generative Information", In. Proc. IEEE Conf. on Computer Vision and Pattern Recognition (2007).
Grabner, et al., "On-line Boosting and Vision", In. Proc. IEEE Conf. on Computer Vision and Pattern Recognition (2006).
R. S. Lin, et al., "Adaptive Discriminative Generative Model and Its Applications", In Proc. Conf. on Neural Information Processing Systems (2005).
Lin, et al., "Adaptive discriminative generative model and its applications", Neural Information Processing Systems Conference, 2004.

* cited by examiner

*Primary Examiner* — Atiba O Fitzpatrick
(74) *Attorney, Agent, or Firm* — Fitzpatrick, Cella, Harper & Scinto

(57) ABSTRACT

An object recognition apparatus comprises: an extraction unit configured to extract a partial region from an image and extract a feature amount; a recognition unit configured to recognize whether the partial region is a target object based on the feature amount and one of a first recognition model including a feature amount of a positive example indicating the target object and a negative example indicating a background and a second recognition model including that of the positive example; an updating unit configured to update the first recognition model by adding the feature amount; and an output unit configured to output an object region recognized as being the target object, wherein the recognition unit performs recognition based on the first recognition model if the object region was output for a previous image, and based on the second recognition model if not.

8 Claims, 4 Drawing Sheets

RESUMING TRACKING AFTER LOSING TARGET

BACKGROUND OF THE INVENTION

1. Field of the Invention

The present invention relates to an object recognition apparatus for detecting a predetermined object in an input image, a control method for the object recognition apparatus, and a storage medium.

2. Description of the Related Art

In recent years, a function for detecting a person's face in an image that is being captured and performing object tracking has rapidly become widespread in digital cameras and video cameras. Such a facial detection and tracking function is extremely useful for automatically focusing on the object to be captured and adjusting the exposure. Technology such as that proposed in Viola and Jones, "Rapid Object Detection using Boosted Cascade of Simple Features", Proceedings of the IEEE Conference on Computer Vision and Pattern Recognition (CVPR2001) has been used to advance the practical use of technology for detecting a face in an image.

Meanwhile, the target to be recognized when applying such recognition technology varies depending on the user and the usage situation. Also, achieving the recognition of various objects requires the provision of dictionaries corresponding to the objects that are to be recognized. However, if there is a wide variety of recognition targets, it becomes practically impossible to collect image patterns including recognition targets and images not including recognition targets by hand. In view of this, an approach has been adopted in which object detection is performed depending on the user and usage situation by an object being designated to be the recognition target in an image and then tracking the designated object. Furthermore, in order to handle changes in the appearance of the object and drift due to the background when tracking the designated object, Grabner and Bischof, "On-line Boosting and Vision", Proceedings of the IEEE Conference on Computer Vision and Pattern Recognition (CVPR2006) proposes a method for tracking while performing online learning using object patterns as positive examples and background patterns as negative examples.

However, when visual contact of the object is lost for example, tracking is paused, and it is necessary to again designate the object for attempting to resume tracking in a scene with a different background. If an attempt is made to detect the object in an image without designation, erroneous detection occurs due to a background that has not been learned yet. The cause for this is that learning was performed using a negative example biased toward the background pattern from before tracking was stopped.

In light of the above-described problem, the present invention provides technology for performing highly precise object detection using an appropriate recognition model, even in the case where tracking is paused and then resumed in a scene with a different background.

SUMMARY OF THE INVENTION

According to one aspect of the present invention, there is provided an object recognition apparatus comprising: an obtaining unit configured to successively obtain images; an extraction unit configured to extract a partial region from an image obtained by the obtaining unit and extract a feature amount from the partial region; a recognition unit configured to recognize whether the partial region is a target object based on the extracted feature amount and one of a first recognition model and a second recognition model, the first recognition model including a feature amount of a positive example indicating the target object and a feature amount of a negative example indicating a background of the target object, and the second recognition model including a feature amount of the positive example; an updating unit configured to, in accordance with a result of the recognition, update the first recognition model by adding the extracted feature amount; and an output unit configured to output an object region recognized as being the target object, wherein the recognition unit performs recognition based on the first recognition model if the object region was output for a previous image obtained by the obtaining unit, and performs recognition based on the second recognition model if the object region was not output for the previous image.

According to one aspect of the present invention, there is provided a method for controlling an object recognition apparatus, the method comprising the steps of: successively obtaining images; extracting a partial region from an image obtained in the obtaining step and extracting a feature amount from the partial region; recognizing whether the partial region is a target object based on the extracted feature amount and one of a first recognition model and a second recognition model, the first recognition model including a feature amount of a positive example indicating the target object and a feature amount of a negative example indicating a background of the target object, and the second recognition model including a feature amount of the positive example; updating, in accordance with a result of the recognition, the first recognition model by adding the extracted feature amount; and outputting an object region recognized as being the target object, wherein in the recognizing step, recognition is performed based on the first recognition model if the object region was output for a previous image obtained in the obtaining step, and recognition is performed based on the second recognition model if the object region was not output for the previous image.

Further features of the present invention will be apparent from the following description of exemplary embodiments with reference to the attached drawings.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

The following describes a first embodiment of the present invention with reference to the accompanying drawings. In the present embodiment, when tracking an object for which the object region at a previous time is known, object recognition is performed using a recognition model obtained by performing additional learning under the condition that the weight of a negative example that is a specific background is high. On the other hand, in the case where the object region at a previous time is not known, such as the case where visual contact of the object is lost, object recognition is performed using a recognition model obtained by performing additional learning under the condition that the weight of the negative example is low (or zero). According to this configuration, even in the case where tracking is paused and then resumed in a scene with a different background, object detection is performed using an appropriate recognition model.

Figure 1:
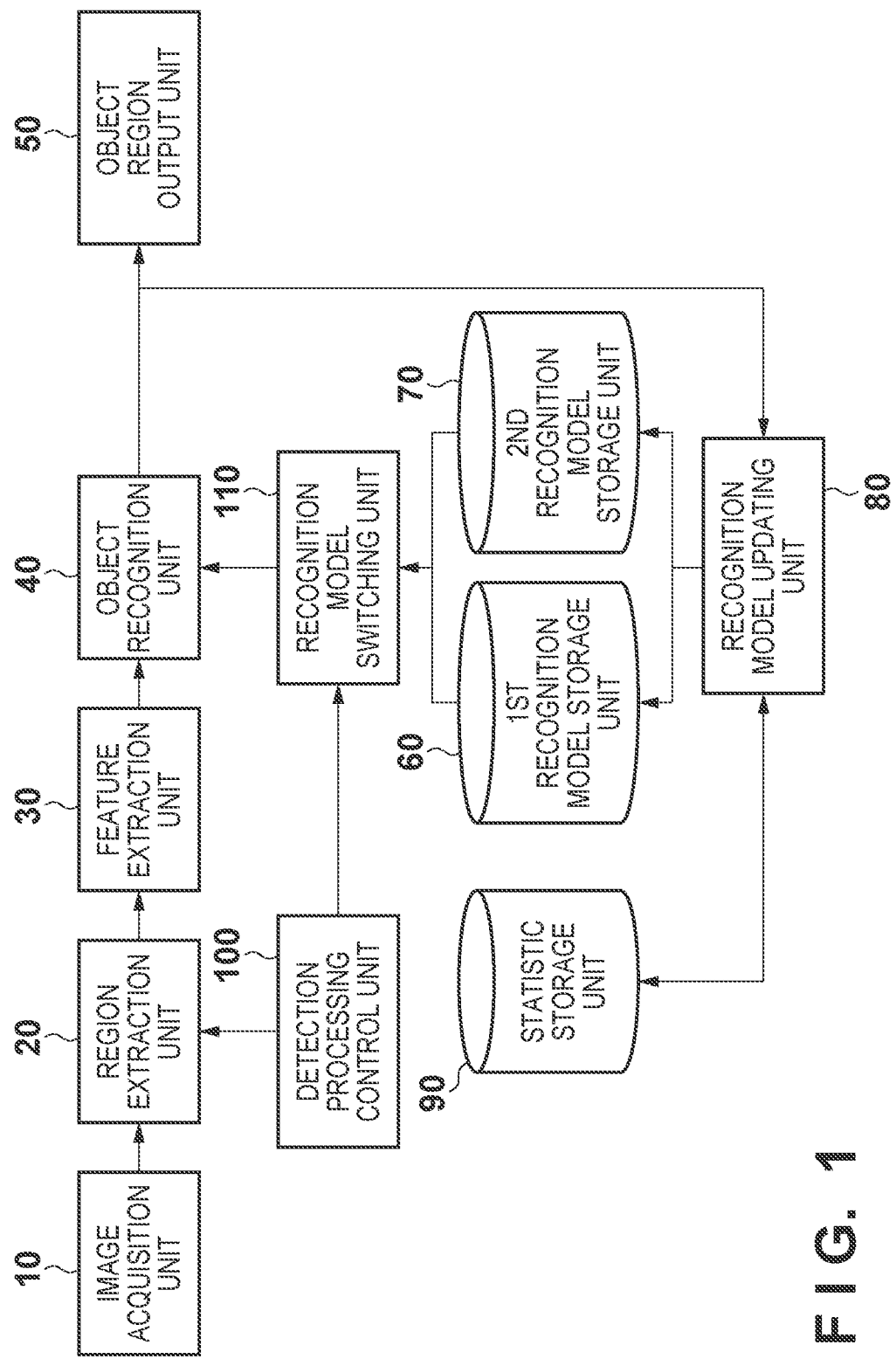
FIG. 1 is a diagram showing the functional configuration of an object recognition apparatus according to an embodiment of the present invention.

FIG. 1 is a diagram showing the functional configuration of an object recognition apparatus according to the present embodiment. The object recognition apparatus includes an image acquisition unit 10, a region extraction unit 20, a feature extraction unit 30, an object recognition unit 40, an object region output unit 50, a first recognition model storage unit 60, a second recognition model storage unit 70, a recognition model updating unit 80, a statistic storage unit 90, a detection processing control unit 100, and a recognition model switching unit 110.

The image acquisition unit 10 successively acquires image data captured by an imaging unit such as a camera. The region extraction unit 20 extracts and clips out a partial region image on which object recognition is to be performed from image data acquired by the image acquisition unit 10.

The feature extraction unit 30 obtains a feature amount for recognizing a desired target object from the partial region image clipped out by the region extraction unit 20. The object recognition unit 40 determines whether the partial region image clipped out by the region extraction unit 20 is the recognition target object based on the feature amount obtained by the feature extraction unit 30.

The object region output unit 50 outputs the result of the recognition performed by the object recognition unit 40. For example, a partial region determined as being the desired object by the object recognition unit 40 is displayed so as to be distinguishable from the other image region.

The first recognition model storage unit 60 and the second recognition model storage unit 70 are memories for respectively storing a first recognition model and a second recognition model used for the object determination performed by the object recognition unit 40 based on the feature amount obtained by the feature extraction unit 30.

The recognition model updating unit 80 updates the first recognition model and the second recognition model stored in the first recognition model storage unit 60 and the second recognition model storage unit 70 based on the result of the recognition performed by the object recognition unit 40.

The statistic storage unit 90 is a memory for storing statistics regarding the feature amounts of a recognition target object sample (positive example) and statistics regarding the feature amounts of a non-recognition target object sample (negative example). The detection processing control unit 100 controls processing in which the region extraction unit 20 clips out a partial region image from image data acquired by the image acquisition unit 10.

The recognition model switching unit 110 switches the recognition model that is used when the object recognition unit 40 performs object determination, the recognition model being switched between the first recognition model and the second recognition model that are respectively stored in the first recognition model storage unit 60 and the second recognition model storage unit 70.

The following assumes the case where a specific person is recognized by an imaging unit such as a digital still camera. First, a person in an image is designated, and the designated person is tracked. The following describes processing operations of the present embodiment in the case where visual contact of the person being tracked is lost, and then tracking is resumed after automatically detecting the person in an image in which the background has changed in a new scene.

First, a description of processing for designating a person in an image and creating recognition models will be given with reference to FIG. 2.

In step S201, the image acquisition unit 10 acquires image data captured by an imaging unit such as a camera. The acquired image data is stored in a memory of the image acquisition unit 10.

In step S202, the image acquisition unit 10 then reduces the acquired image data to desired image sizes. For example, reduced images having different magnification factors are created by perform processing for reducing the acquired image data a predetermined number of times, such as first reducing the image data by a factor of 0.8, then further reducing that by a factor of 0.8 (e.g., a factor of 0.8×2), and so on, and the reduced images are stored in the memory of the image acquisition unit 10. This is performed in order to recognize the object at various sizes in images.

In step S203, the image data acquired by the image acquisition unit 10 is displayed on a display (not shown), and the user designates, via an input interface (not shown), the recognition target object appears in a frame. As one example of a designation method, the user designates a rectangular region surrounding an object (a person in this case).

In step S204, the region that the user designated to be the object image in the image data is clipped out as a partial region image by the region extraction unit 20. Here, the region designated by the user may have various sizes and shapes. For this reason, a reduced image having an optimum magnification factor is obtained from among the reduced images created in step S202 such that the designated rectangular region fits in a predetermined size, and a partial region on which recognition is to be performed is clipped out from an optimum position in the reduced image that was obtained. Also, the detection processing control unit 100 performs control such that clipping is performed also for a reduced image in the neighborhood of the partial image obtained here (i.e., having a neighboring magnification factor), and a partial region at a neighboring position.

For example, assuming that the size of the partial region is a region of approximately 20×20 pixels, a partial region is clipped out such that 90% or more of the partial region overlaps the rectangular region designated by the user. The magnification factors of the reduced images from which partial regions were clipped out and the positions of the object in the images are stored as object states.

In step S205, the feature extraction unit 30 obtains a feature amount from a partial region image, which is an object image clipped out by the region extraction unit 20. In the case where the size of the partial region is 20×20 pixels, luminance data is extracted from the partial region image and converted into a 400-dimensional feature vector. Recognition can be performed in a stable manner regardless of the lighting condition at the time of imaging by normalizing the luminance data using a method such as histogram smoothing before conversion into a feature vector. Also, besides luminance data, the feature amount may be obtained by extracting a color or edge, or may be a single feature vector that is a combination thereof. The feature amount obtained here is output to the recognition model updating unit 80 as a positive example feature amount.

The detection processing control unit 100 performs control such that the processing in steps S204 and S205 is sequentially repeated on each partial region image.

In step S206, the region extraction unit 20 then clips out, as a non-object image, a partial region image from the region outside the region designated by the user in the image data. Here, a background image not including the person is clipped out as the non-object image. In this step, the size of the partial region clipped out by the detection processing control unit 100 is the same as the size of the partial region that was clipped out in step S204. Also, regarding the range of clipping in this step, the partial region is clipped out such that, for example, 90% or more of the partial region does not overlap the rectangular region designated by the user.

In step S207, similarly to step S205, the feature extraction unit 30 obtains a feature amount from a partial region image, which is a non-object image clipped out by the region extraction unit 20. The feature amount obtained here is output to the recognition model updating unit 80 as a negative example feature amount.

The detection processing control unit 100 performs control such that the processing in steps S206 and S207 is sequentially repeated for each partial region image. In step S208, the recognition model updating unit 80 performs statistic updating using the positive example and negative example feature amounts obtained by the feature extraction unit 30, and updates the recognition models.

The present embodiment describes a method applied to the present embodiment in the case of performing recognition using a recognition model with which adaptive learning is possible as proposed in Lin et al., "Adaptive discriminative generative model and its applications", Neural Information Processing Systems Conference, 2004. Regarding the positive example feature amounts, a mean vector and a covariance matrix are obtained from the positive example feature vectors collected here. The covariance matrix is then subjected to eigenvalue decomposition, and a predetermined number of highest eigenvalues and their corresponding eigenvectors are stored as statistics in the statistic storage unit 90 along with the mean vector. The number of eigenvalues is approximately 50, for example.

Meanwhile, regarding the negative example feature amounts, generally various image patterns that could possibly be background patterns are collected in advance in conformity with the size of the partial region that is clipped out by the region extraction unit 20, and the feature extraction unit 30 obtains feature amounts for the collected image patterns. Then, similarly to the positive example feature amounts, eigenvalues and eigenvectors are stored as statistics in the statistic storage unit 90 along with the mean vector. Furthermore, the recognition model updating unit 80 uses the method proposed in Lin et al., "Adaptive discriminative generative model and its applications", Neural Information Processing Systems Conference, 2004 to perform statistic updating for the negative example feature amounts using the negative example feature amounts obtained in step S207 as additional samples. Specifically, updating is performed using the mean vector, eigenvalues, and eigenvectors that are statistics for the negative example feature amounts and were stored in advance in the statistic storage unit 90, and using the added negative example feature amounts, and the updated statistics are newly stored in the statistic storage unit 90. Here, the statistics for the negative example feature amounts that were obtained in advance remain stored, and the updated statistics for the negative example feature amounts are stored separately. Note that in Lin et al., "Adaptive discriminative generative model and its applications", Neural Information Processing Systems Conference, 2004, a forgetting factor is used as a parameter when updating the eigenvalues and eigenvectors by adding samples. Using this forgetting factor enables changing the weight of the negative examples that are added. A configuration is possible in which multiple statistics for negative example feature amounts are obtained by performing multiple updating processes using high and low forgetting factors on the statistics for negative example feature amounts that were stored in advance, and the obtained statistics are stored in the statistic storage unit 90. The case where the forgetting factor is 0 (small) corresponds to the case where the statistics for negative example feature amounts that were obtained in advance are stored as they are, without being updated.

The recognition model updating unit 80 updates the recognition models using the statistics for positive example and negative example feature amounts that are stored in the statistic storage unit 90. The first recognition model is obtained using the statistics for positive example feature amounts and the statistics for negative example feature amounts that were updated by adding the negative example feature amounts obtained in step S207, and the obtained first recognition model is stored in the first recognition model storage unit 60. On the other hand, the second recognition model is obtained using the statistics for positive example feature amounts and the statistics for negative example feature amounts that were obtained in advance from general background patterns, and the obtained second recognition model is stored in the second recognition model storage unit 70. Note that as an alternative, a configuration is possible in which the statistics for negative example feature amounts for obtaining the first recognition model are updated using a high forgetting factor, and the statistics for negative example feature amounts for obtaining the second recognition model are updated using a low forgetting factor. In this case, the first and second recognition models are each stored as a projection matrix, and are used in the determination processing performed by the object recognition unit 40.

Figure 3:
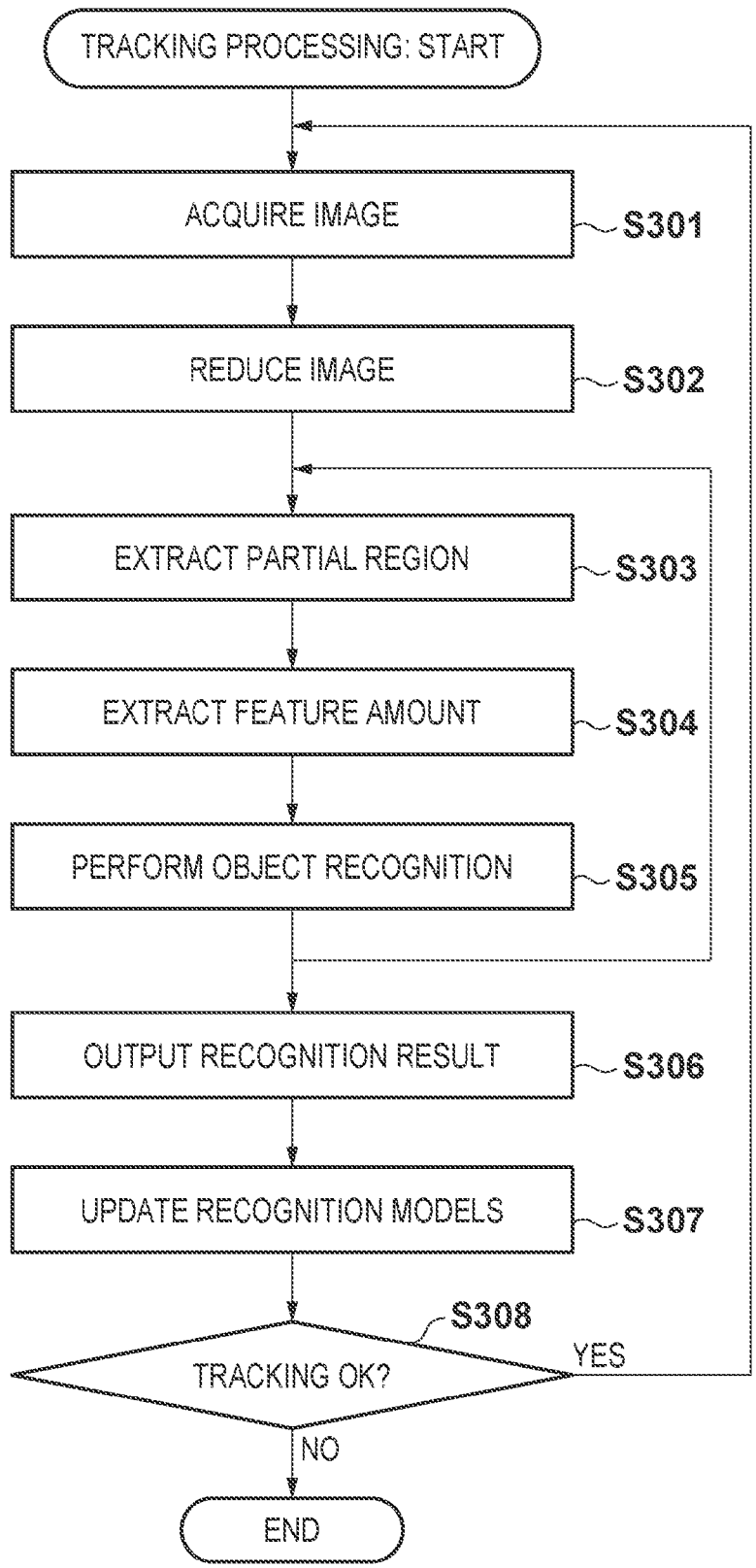
FIG. 3 is a diagram illustrating tracking processing according to an embodiment of the present invention.

Next, a description of processing for tracking a person in an image will be given with reference to FIG. 3.

Figure 2:
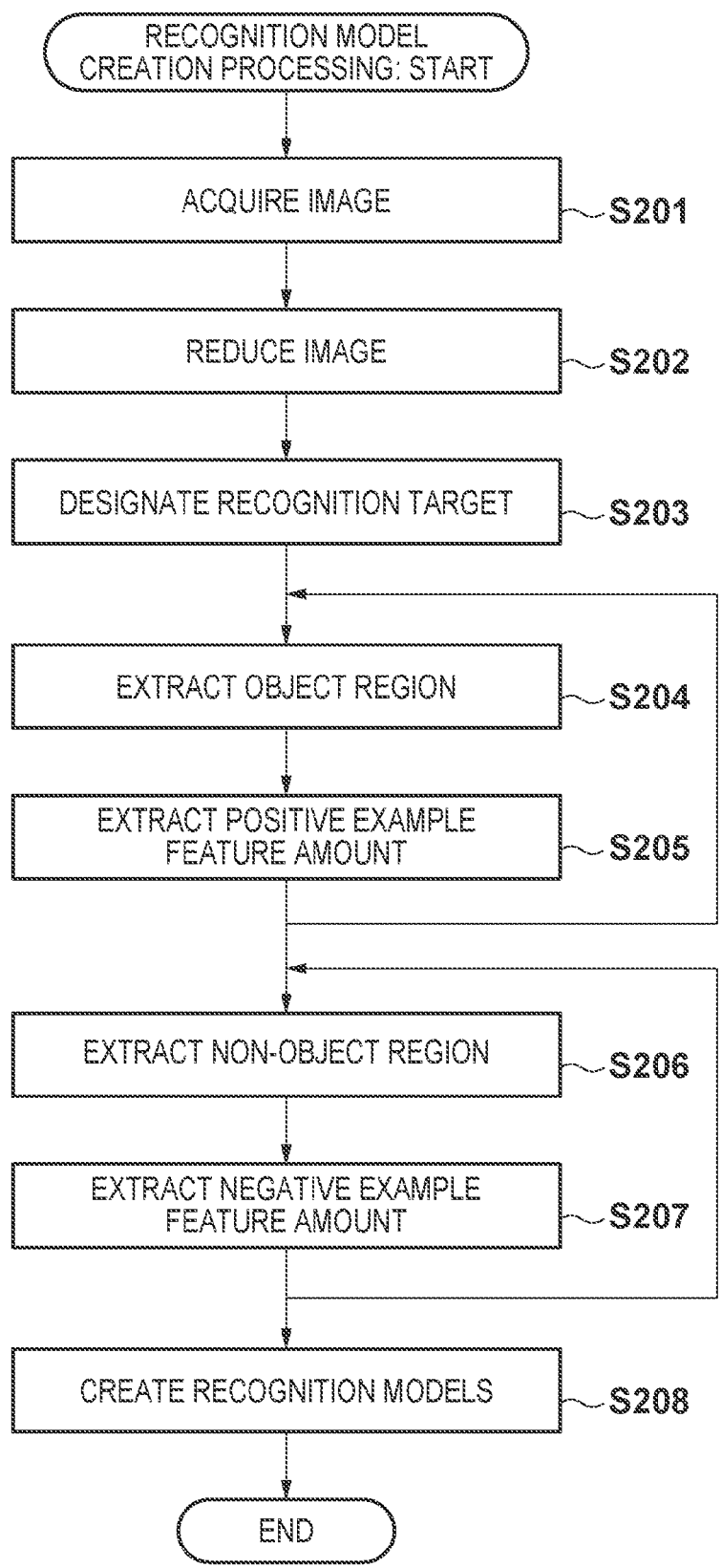
FIG. 2 is a diagram illustrating recognition model creation processing according to an embodiment of the present invention.

In step S301, similarly to step S201 in FIG. 2, the image acquisition unit 10 acquires image data captured by an imaging unit such as a camera.

In step S302, similarly to step S202, the image acquisition unit 10 then reduces the acquired image data to desired image sizes.

In step S303, a partial region image to serve as a processing target region in object recognition is clipped out from the image data by the region extraction unit 20. Here, the detection processing control unit 100 performs control such that clipping is sequentially performed for a reduced image in the neighborhood of the person region in the previous frame and a partial region at a neighboring position, from the image acquired by the image acquisition unit 10 and multiple reduced images. Specifically, partial regions are extracted such that recognition can be performed by estimating the state of the object in the image based on the state of the object in the previous frame. For example, object recognition is performed such that the 50% or more of the partial region extracted here overlaps the object region in the previous frame.

In step S304, similarly to step S205, the feature extraction unit 30 obtains a feature amount for recognizing a desired object in a partial region image clipped out by the region extraction unit 20.

In step S305, the object recognition unit 40 determines whether the partial region image clipped out by the region extraction unit 20 is the recognition target object based on the feature amounts obtained by the feature extraction unit 30.

Here, the recognition model switching unit 110 switches the recognition model such that the object recognition unit 40 references the first recognition model stored in the first recognition model storage unit 60 when performing processing. The object recognition unit 40 projects the feature vector obtained by the feature extraction unit 30 using a projection matrix, determines that the partial region image is the object if the distance to the projective plane is less than or equal to a predetermined threshold value, and otherwise determines that the partial region image is not the object. The determination result is output to the object region output unit 50 along with information indicating the position and magnification factor of the partial region that was subjected to processing. Here, since the object recognition unit 40 performs determination processing using a recognition model obtained by adding a negative example unique to the scene when perform learning, determination can be performed with favorable precision in the same scene. Also, a feature amount determined as being the object by the object recognition unit 40 is output to the recognition model updating unit 80 as a positive example feature amount, and a feature amount determined as not being the object is output to the recognition model updating unit 80 as a negative example feature amount.

The detection processing control unit 100 performs control such that the processing in steps S303 to S305 is sequentially repeated for each partial region image. In step S306, the object region output unit 50 outputs the detection result obtained by the object recognition unit 40. Here, in the case where multiple partial regions are recognized as being the predetermined person in an image, the partial region having the highest determination result (i.e., the determination result for which the distance calculated by the object recognition unit 40 is the lowest) is output.

In step S307, similarly to step S208, the recognition model updating unit 80 then performs statistic updating using the positive example and negative example feature amounts obtained by the feature extraction unit 30, and updates the recognition models. Here, since samples are added for the positive example as well, the statistics for positive example feature amounts are updated similarly to the updating of the statistics for negative example feature amounts. Note that the statistics for positive example feature amounts generally are not dependent on the scene, and therefore one statistic is successively updated in the present embodiment. Of course, in the case of where people and objects are to be distinguished depending on the scene, a configuration is possible in which multiple statistics are obtained using additional samples having different weights, similarly to the statistics for negative example feature amounts.

In step S308, a control unit (not shown) determines whether visual contact of the person to be tracked has been lost. If it was determined that visual contact of the person to be tracked has not been lost (step S308: YES), the procedure returns to step S301. The processing of steps S301 to S307 is sequentially repeated on the input frames acquired by the image acquisition unit 10 under the control of the control unit (not shown) such as a CPU. On the other hand, if it was determined that visual contact of the person to be tracked has been lost (step S308: NO), processing ends.

Figure 4:
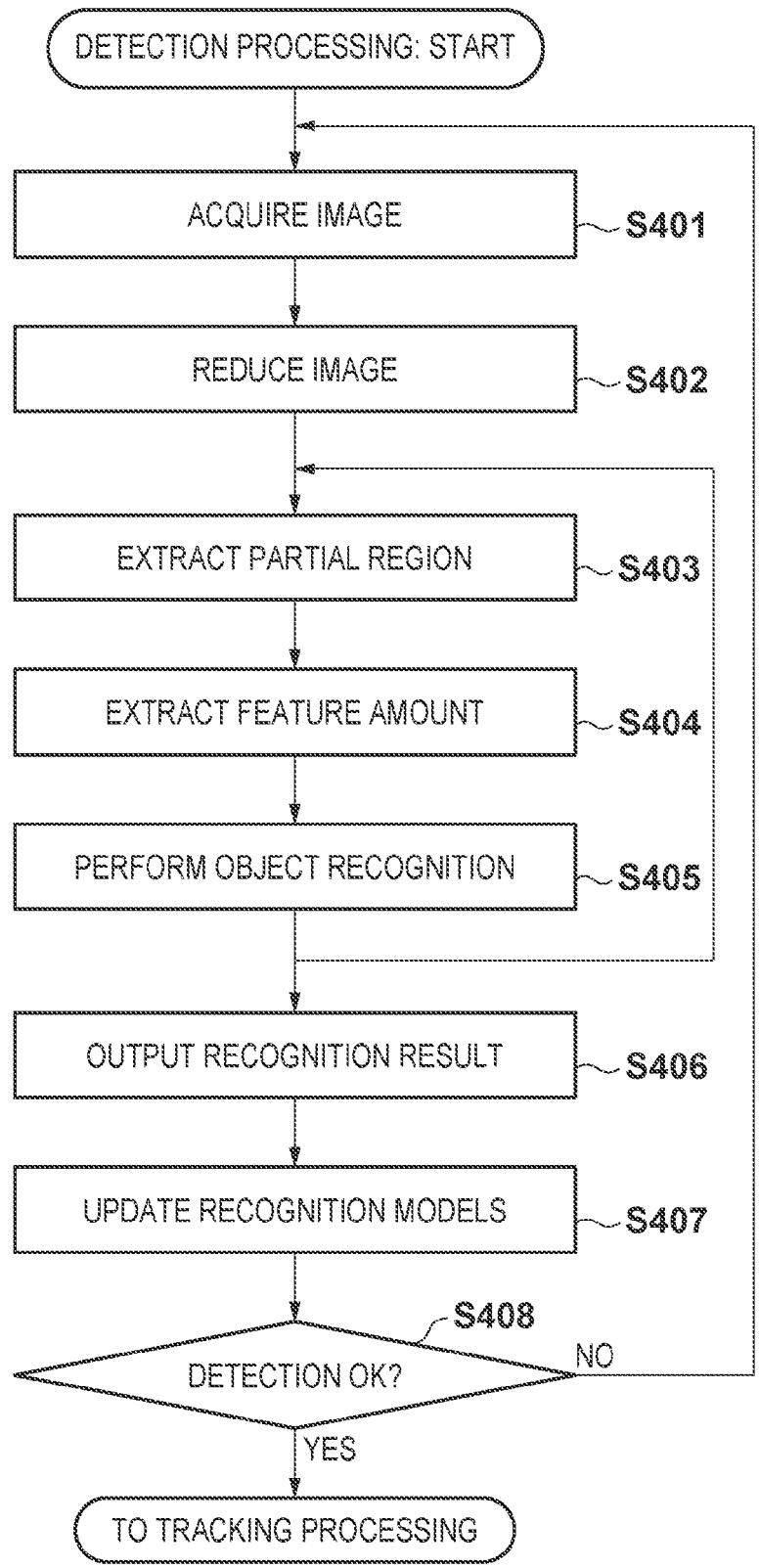
FIG. 4 is a diagram illustrating detection processing according to an embodiment of the present invention.

Next, processing for detecting a person in the case where visual contact of the person being tracked is lost and the background has changed in a new scene will be described with reference to FIG. 4.

In step S401, similarly to step S201, the image acquisition unit 10 acquires image data captured by an imaging unit such as a camera. In step S402, similarly to step S202, the image acquisition unit 10 then reduces the acquired image data to multiple desired image sizes.

In step S403, a partial region image to serve as a processing target region in object recognition is clipped out from the image data by the region extraction unit 20. Here, the detection processing control unit 100 performs control such that, for the image acquired by the image acquisition unit 10 and each of the reduced images, partial regions of a predetermined size are sequentially clipped out from positions shifted by a predetermined amount from the upper left edge of the image to the lower right edge. In other words, partial regions are extracted comprehensively from various positions in the image so as to enable recognizing the object at various magnification factors. This is because there is no previous information, and it is impossible to estimate the state (position and magnification factor) of the person. For example, the clipping position is shifted such that the partial regions are 90% vertically and horizontally overlapping.

In step S404, similarly to step S205, the feature extraction unit 30 obtains a feature amount for recognizing a desired object in a partial region image clipped out by the region extraction unit 20.

In step S405, similarly to step S305, the object recognition unit 40 determines whether the partial region image clipped out by the region extraction unit 20 is the recognition target object based on the feature amount obtained by the feature extraction unit 30. Note that the recognition model switching unit 110 switches the recognition model such that the object recognition unit 40 references the second recognition model stored in the second recognition model storage unit 70 when performing processing. Here, since the object recognition unit 40 performs determination processing using a recognition model obtained without adding a negative example unique to the scene when perform learning, determination can be performed with favorable precision in a scene in which the object newly appears. In other words, a recognition model obtained by adding a negative example biased toward the previous scene when performed learning is not used, thus enabling reducing the occurrence of erroneous detection.

The detection processing control unit 100 performs control such that the processing in steps S403 to S405 is sequentially repeated for the partial region of each magnification factor at various positions in the image.

In step S406, similarly to step S306, the object region output unit 50 outputs the result of the recognition performed by the object recognition unit 40. In step S407, similarly to step S307, the recognition model updating unit 80 then performs statistic updating using the positive example and negative example feature amounts obtained by the feature extraction unit 30, and updates the recognition models.

In step S408, a control unit (not shown) determines whether the person was detected in the image. If it was determined that the person was detected in the image (step S408: YES), this processing ends, and the procedure moves to the tracking processing that was described with reference to FIG. 3. On the other hand, if it was determined that the person was not detected in the image (step S408: NO), the procedure returns to step S401. The processing of steps S401 to S407 is sequentially repeated on the input frames successively acquired by the image acquisition unit 10 under the control of the control unit (not shown) such as a CPU.

In the present embodiment, in the case of performing tracking processing, recognition is performed using a recognition model obtained by using a background unique to a scene as a negative example when performing learning, and in the case of performing detection processing, recognition is performed using a recognition model obtained by using a general background as a negative example when performing learning. Accordingly, even in the case where tracking is paused and then resumed in a scene with a different background, object detection can be performed using an appropriate recognition model.

Also, statistics for the feature amounts of a positive example, which is the object serving as the detection target, for the feature amounts of a negative example are stored separately, and furthermore, negative example statistics with different weights for added negative examples are stored separately. Accordingly, recognition models whose added negative examples have different weights can be easily updated using the stored statistics, and an appropriate recognition model can be used in tracking processing and detection processing as previously described.

Note that although the example of applying the method proposed in Lin et al., "Adaptive discriminative generative model and its applications", Neural Information Processing Systems Conference, 2004 as the method of performing learning by adding samples and performing recognition in the present embodiment, the method of learning and recognition is not limited to this. For example, it is possible to apply the method based on online boosting learning proposed in Grabner and Bischof, "On-line Boosting and Vision", Proceedings of the IEEE Conference on Computer Vision and Pattern Recognition (CVPR2006). For example, the method of learning and recognition proposed in Japanese Patent Laid-Open No. 2008-217768, which is an improvement on Grabner and Bischof, "On-line Boosting and Vision", Proceedings of the IEEE Conference on Computer Vision and Pattern Recognition (CVPR2006), is configured such that a weak classifier configuring a boosting classifier is applied to additional samples. In Japanese Patent Laid-Open No. 2008-217768, the respective recognition models are updated using statistics regarding negative example feature amounts for which the periods of storage are different, and the recognition models can be selectively referenced in tracking processing and detection processing. The storage periods in Japanese Patent Laid-Open No. 2008-217768 are used equivalently with the weighting of negative examples in the present embodiment in the meaning of controlling the forgetting of samples.

Second Embodiment

The following describes a second embodiment of the present invention with reference to the attached drawings. In the present embodiment, when tracking an object for which the object region at a previous time is known, object recognition is performed using a recognition model obtained by performing additional learning using a negative example feature amount extracted from a specific background. On the other hand, in the case where the object region at a previous time is not known, such as the case where visual contact of an object is lost, object recognition is performed using a recognition model obtained by performing learning using only a positive example such that the characteristics of the recognition are not biased toward a specific background. According to this configuration, even in the case where tracking is paused and then resumed in a scene with a different background, object detection is performed using an appropriate recognition model.

The functional configuration of an object recognition apparatus of the present embodiment is similar to the configuration described in the first embodiment, and therefore a description thereof will not be given. The following assumes the case where a specific person is recognized by an imaging unit such as a digital still camera. First, a person in an image is designated, and the designated person is tracked. The following describes processing operations of the present embodiment in the case where visual contact of the person being tracked is lost, and then tracking is resumed after automatically detecting the person in an image in which the background has changed in a new scene.

First, similarly to the first embodiment, a description of processing for designating a person in an image and creating recognition models will be given with reference to FIG. 2. Note that a description of processing similar to that in the first embodiment will not be given, and only differing points will be described.

The processing of steps S201 to S203 is similar to that in the first embodiment. In step S204, the region extraction unit 20 clips out, as an object image, a partial region image from the region designated by the user in the image data. Here, the region designated by the user may have various sizes and shapes. For this reason, a reduced image having an optimum magnification factor is obtained from among the reduced images created in step S202 such that the designated rectangular region fits in a predetermined size, and a partial region on which recognition is to be performed is clipped out from an optimum position in the reduced image that was obtained. Also, the detection processing control unit 100 performs control such that clipping is performed also for a reduced image in the neighborhood of the partial image obtained here (i.e., having a neighboring magnification factor), and a partial region at a neighboring position. For example, if the size of the rectangular region designated by the user is approximately 200×100 pixels, a rectangular region of 40×20 pixels corresponding to roughly the same region is obtained from a reduced image, and a partial region is clipped out such that 90% or more of the partial regions overlap each other. The magnification factor of the reduced image from which the partial region was clipped out and the position of the object in the image are stored as object states.

In step S205, the feature extraction unit 30 obtains a feature amount from a partial region image, which is an object image clipped out by the region extraction unit 20. In the case where the size of the partial region is 40×20 pixels, luminance data is extracted from the partial region image and converted into an 800-dimensional feature vector. The feature amount obtained here is output to the recognition model updating unit 80 as a positive example feature amount.

The processing of steps S206 and S207 is similar to that in the first embodiment. In step S208, the recognition model updating unit 80 obtains statistics and recognition models based on the positive example and negative example feature amounts obtained by the feature extraction unit 30. Regarding the positive example feature amounts, a mean vector and a covariance matrix are obtained from the positive example feature vectors collected here. The covariance matrix is then subjected to eigenvalue decomposition, and a predetermined number of highest eigenvalues and their corresponding eigenvectors are stored as statistics in the statistic storage unit 90 along with the mean vector. The number of eigenvalues is approximately 50, for example. Then, regarding the negative example feature amounts, eigenvalues and eigenvectors are similarly stored as statistics in the statistic storage unit 90 along with a mean vector. Recognition models are then obtained using the statistics for the positive example and negative example feature amounts stored in the statistic storage unit 90. A first recognition model is obtained based on the statistics for positive example feature amounts and the statistics for negative example feature amounts, and the first recognition model is stored in the recognition model storage unit

70. On the other hand, a second recognition model is obtained based on the statistics for positive example feature amounts, and the second recognition model is stored in the recognition model storage unit 60. Here, the first recognition model and the second recognition model are respectively stored as projection matrices, and are used in the determination processing performed by the object recognition unit 40.

Next, a description of processing for tracking a person in an image will be given with reference to FIG. 3. Note that a description of processing similar to that in the first embodiment will not be given, and only differing points will be described.

The processing of steps S301 to S304 is similar to that in the first embodiment. In step S305, the object recognition unit 40 determines whether the partial region image clipped out by the region extraction unit 20 is the recognition target object based on the feature amount obtained by the feature extraction unit 30. Here, the recognition model switching unit 110 switches the recognition model such that the object recognition unit 40 references the first recognition model stored in the first recognition model storage unit 60 when performing processing. The object recognition unit 40 projects the feature vector obtained by the feature extraction unit 30 using a projection matrix, and determines that the partial region image is the object if the distance to the projective plane is less than or equal to a predetermined threshold value, and otherwise determines that the partial region image is not the object. The determination result is output to the object region output unit 50 along with information indicating the position and magnification factor of the partial region that was subjected to processing. Here, since the object recognition unit 40 performs determination processing using a recognition model obtained by performing learning using a positive example that is the object pattern and a negative example that is unique to the scene, determination can be performed with favorable precision in the same scene. Also, a feature amount determined as being the object by the object recognition unit 40 is output to the recognition model updating unit 80 as a positive example feature amount, and a feature amount determined as not being the object is output to the recognition model updating unit 80 as a negative example feature amount.

The processing of step S306 is similar to that in the first embodiment. In step S307, the recognition model updating unit 80 performs statistic updating by adding the positive example and negative example feature amounts obtained by the feature extraction unit 30, and updates the recognition models. The adaptive learning proposed in Lin et al., "Adaptive discriminative generative model and its applications", Neural Information Processing Systems Conference, 2004, is used in the present embodiment. Regarding the positive example feature amounts, the mean vector, eigenvalues, and eigenvectors that are the statistics for the positive example feature amounts stored in the statistic storage unit 90 are updated by adding the positive example feature amounts on which determination was performed in step S305. Statistics for the negative example feature amounts are updated in a similar manner. The updated feature amounts are respectively stored in the statistic storage unit 90. Then, similarly to step S208, recognition model updating is performed using the updated statistics for positive example and negative example feature amounts that are stored in the statistic storage unit 90. The processing of step S308 is similar to that in the first embodiment.

Next, processing for detecting a person in the case where visual contact of the person being tracked is lost and the background has changed in a new scene will be described with reference to FIG. 4. Note that a description of processing similar to that in the first embodiment will not be given, and only differing points will be described.

The processing of steps S401 to S404 is similar to that in the first embodiment. In step S405, similarly to step S305, the object recognition unit 40 determines whether the partial region image clipped out by the region extraction unit 20 is the recognition target object based on the feature amount obtained by the feature extraction unit 30. Note that the recognition model switching unit 110 switches the recognition model such that the object recognition unit 40 references the second recognition model stored in the second recognition model storage unit 70 when performing processing. Here, since the object recognition unit 40 performs determination processing using a recognition model obtained without adding a negative example unique to the scene and only using a positive example when perform learning, determination can be performed with favorable precision in a scene in which the object newly appears. In other words, a recognition model obtained by adding a negative example biased toward the previous scene when performing learning is not used, thus enabling reducing the occurrence of erroneous detection.

The processing of step S406 is similar to that in the first embodiment. In step S407, the recognition model updating unit 80 then performs statistic updating based on the positive example and negative example feature amounts obtained by the feature extraction unit 30, and updates the recognition models. Similarly to step S307, regarding the positive example feature amounts, the mean vector, eigenvalues, and eigenvectors that are the statistics for positive example feature amounts stored in the statistic storage unit 90 are updated by adding the positive example feature amounts on which determination was performed in step S405. On the other hand, regarding negative example feature amounts, the statistics for negative example feature amounts stored in the statistic storage unit 90 are once initialized. Then, similarly to step S208, statistics are obtained based on the negative example feature amounts on which determination was performed in step S405. In other words, since the statistics for positive example feature amounts are generally not dependent on the scene, these statistics are successively updated even if the scene changes. On the other hand, the statistics for negative example feature amounts are initialized since they are dependent on the scene, and statistics are obtained based on feature amounts after the scene has changed. The processing of step S408 is similar to that in the first embodiment.

In the present embodiment, in the case of performing tracking processing, recognition is performed using a recognition model obtained by using a positive example that is an object pattern and a negative example that is a background unique to a scene when performing learning, and in the case of performing detection processing, recognition is performed using a recognition model obtained by performing learning using a positive example. Accordingly, even in the case where tracking is paused and then resumed in a scene with a different background, object detection can be performed using an appropriate recognition model.

Also, statistics for the feature amounts of a positive example of the object serving as the detection target and for the feature amounts of a negative example are stored separately. Accordingly, a recognition model based on a positive example and a recognition model (identification model) based on a positive example and a negative example can be easily updated using a positive example and a negative example that were added using stored statistics. As a result, an appropriate recognition model can be used in tracking processing and detection processing as previously described.

Also, if the scene has changed, the statistics for negative example feature amounts corresponding to the background are initialized. Accordingly, if the scene has changed, the target object can be highly precisely recognized using a newly-obtained recognition model.

Note that although the example of applying the method proposed in Lin et al., "Adaptive discriminative generative model and its applications", Neural Information Processing Systems Conference, 2004 to the present invention as the method of performing learning by adding samples and performing recognition in the present embodiment, the method of learning and recognition is not limited to this.

For example, Grabner et al., "Eigenboosting: Combining Discriminative and Generative Information", Proceedings of the IEEE Conference on Computer Vision and Pattern Recognition (CVPR2007) proposes a method for training a weak classifier configuring a boosting classifier using a combination of a generation model based on positive example sample learning and an identification model based on positive example and negative example learning. Here, when recognition model learning is performed, the error function used in boosting learning is a combination of error arising from the generation model and error arising from the identification model. In order for application to the present embodiment, it is sufficient that the first recognition model and the second recognition model of the present embodiment are trained based on statistics for positive example and negative example feature amounts that have been updated by changing the weights of the respective combinations of error. In other words, if the error function is defined by only error arising from the generation model, the second recognition model can be trained. Also, if the error function is defined by only error arising from the identification model, the first recognition model can be trained. Alternatively, the first recognition model may be obtained by adding a recognition model trained using an error function that is a combination of respective errors, as proposed in Grabner et al., "Eigenboosting: Combining Discriminative and Generative Information", Proceedings of the IEEE Conference on Computer Vision and Pattern Recognition (CVPR2007).

The present invention enables performing highly precise object detection using an appropriate recognition model, even in the case where tracking is paused and then resumed in a scene with a different background.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-105647 filed on May 10, 2011, which is hereby incorporated by reference herein in its entirety.

What is claimed is:

1. An object recognition apparatus comprising:
an obtaining unit configured to successively obtain images;
an extraction unit configured to extract a partial region from an image obtained by the obtaining unit and extract a feature amount from the partial region;
a recognition unit configured to recognize whether the partial region is an image of a target object based on the extracted feature amount and one of a first recognition model and a second recognition model, the first recognition model including a feature amount of a positive example indicating the target object and a feature amount of a negative example indicating a background of the target object, and the second recognition model including a feature amount of the positive example and a feature amount of the negative example set in advance;
an updating unit configured to, in accordance with a result of the recognition, update the first recognition model by adding the extracted feature amount to the positive example if the partial region is recognized as being the image of the target object, and adding the extracted feature amount to the negative example if the partial region is not recognized as being the image of the target object; and
an output unit configured to output an object region recognized as being the image of the target object,
wherein the recognition unit performs recognition on a current image based on the first recognition model including the updated feature amount of the negative example if the object region has been output for a previous image obtained by the obtaining unit, and performs recognition on the current image based on the second recognition model including the feature amount of the negative example set in advance if the object region has not been output for the previous image.

2. The object recognition apparatus according to claim 1, wherein if the object region was output for the previous image, the extraction unit estimates the position of the target object based on the previous image and extracts the partial region using the estimated position.

3. The object recognition apparatus according to claim 1, wherein the first recognition model includes a statistic on the feature amount of the positive example and a statistic on the feature amount of the negative example.

4. The object recognition apparatus according to claim 3, wherein if the object region ceased to be output for the previous image, the statistic on the feature amount of the negative example is initialized.

5. The object recognition apparatus according to claim 1, wherein the second recognition model further includes a feature amount of a background pattern that was collected in advance as the feature amount of the negative example.

6. The object recognition apparatus according to claim 5, wherein the second recognition model includes a statistic on the feature amount of the positive example.

7. A method for controlling an object recognition apparatus, the method comprising the steps of:
successively obtaining images;
extracting a partial region from an image obtained in the obtaining step and extracting a feature amount from the partial region;
recognizing whether the partial region is an image of a target object based on the extracted feature amount and one of a first recognition model and a second recognition model, the first recognition model including a feature amount of a positive example indicating the target object and a feature amount of a negative example indicating a background of the target object, and the second recognition model including a feature amount of the positive example and a feature amount of the negative example set in advance;

updating, in accordance with a result of the recognition, the first recognition model by adding the extracted feature amount to the positive example if the partial region is recognized as being the image of the target object, and adding the extracted feature amount to the negative example if the partial region is not recognized as being the image of the target object; and outputting an object region recognized as being the image of the target object, wherein in the recognizing step, recognition is performed on a current image based on the first recognition model including the updated feature amount of the negative example if the object region has been output for a previous image obtained in the obtaining step, and recognition is performed on the current image based on the second recognition model including the feature amount of the negative example set in advance if the object region has not been output for the previous image.

8. A non-transitory computer-readable storage medium storing a computer program for causing a computer to execute the steps of the method for controlling an object recognition apparatus according to claim 7.

* * * * *